(12) United States Patent
Tsai

(10) Patent No.: US 8,274,457 B2
(45) Date of Patent: Sep. 25, 2012

(54) DRIVING DEVICE OF LIGHT EMITTING UNIT

(75) Inventor: Tsung-Ting Tsai, Tainan (TW)

(73) Assignee: Au Optronics Corporation, Hsinchu (TW)

( * ) Notice: Subject to any disclaimer, the term of this patent is extended or adjusted under 35 U.S.C. 154(b) by 395 days.

(21) Appl. No.: 12/729,239

(22) Filed: Mar. 23, 2010

(65) Prior Publication Data

US 2011/0156611 A1 Jun. 30, 2011

(30) Foreign Application Priority Data

Dec. 31, 2009 (TW) ............................... 98146197 A

(51) Int. Cl.
*G09G 3/30* (2006.01)

(52) U.S. Cl. .............. 345/78; 345/77; 345/90; 345/212; 345/213; 315/291; 315/169.1; 327/198; 327/538

(58) Field of Classification Search ............... 315/169.1, 315/169.3, 291, 312; 345/44–46, 55, 76–78, 345/82, 83, 90, 92, 98, 102, 211–213; 327/198, 327/538, 541, 543; 323/312
See application file for complete search history.

(56) References Cited

U.S. PATENT DOCUMENTS

| 6,937,215 | B2 | 8/2005 | Lo | |
| 7,173,584 | B2* | 2/2007 | Kimura et al. | 345/78 |
| 7,292,210 | B2* | 11/2007 | Sun | 345/82 |
| 7,317,435 | B2 | 1/2008 | Hsueh | |
| 7,327,357 | B2 | 2/2008 | Jeong | |
| 7,429,985 | B2* | 9/2008 | Kimura et al. | 345/213 |
| 2007/0024540 | A1* | 2/2007 | Ryu et al. | 345/76 |
| 2011/0157147 | A1* | 6/2011 | Tsai | 345/213 |

* cited by examiner

*Primary Examiner* — Haiss Philogene
(74) *Attorney, Agent, or Firm* — Jianq Chyun IP Office

(57) ABSTRACT

A driving device of a light emitting unit is provided. The driving device includes a driving circuit, a switch, a capacitor, and a compensation circuit. The driving circuit has a control terminal and a driving terminal connected to the light emitting unit. The driving circuit determines a driving current according to the voltage on the control terminal. The switch has a first end for receiving a data voltage, a second end connected to the light emitting unit, and a control end for receiving a scan voltage. The capacitor has a first end connected to the control terminal of the driving circuit and a second end connected to the second end of the switch. The compensation circuit has an output terminal connected to the first end of the capacitor. The compensation circuit supplies a reset voltage to the first end of the capacitor when the switch is turned on.

18 Claims, 3 Drawing Sheets

DRIVING DEVICE OF LIGHT EMITTING UNIT

CROSS-REFERENCE TO RELATED APPLICATION

This application claims the priority benefit of Taiwan application serial no. 98146197, filed on Dec. 31, 2009. The entirety of the above-mentioned patent application is hereby incorporated by reference herein and made a part of specification.

BACKGROUND OF THE INVENTION

1. Field of the Invention

The present invention generally relates to a driving device of a light emitting unit, and more particularly, to a driving device of a light emitting unit in a pixel circuit.

2. Description of Related Art

Along with the development of electronics technology, the demand for visual services on consumable electronic products has been ever increasing. A high image display quality is desired in such an electronic device as a TV set, a personal computer, or a mobile phone, etc. Various flat panel display techniques have been provided, such as the organic light-emitting diode (OLED, also referred to as organic electroluminescence (OEL)). Compared to other flat panel display techniques, the OLED technique has such advantages as low power consumption, ultra thinness, light weight, self luminosity, unlimited viewing angle, instant response, high photoelectric efficiency, backlight structure and color filter structure independence, high contrast, high luminance efficiency, high brightness, capability of fabricating multicolor and RGB components, and wide working temperature range therefore is considered one of the most promising flat panel display techniques.

A flat display panel usually adopts light-emitting diodes (LEDs) or OLEDs as pixel devices thereof, and a driving circuit of the flat display panel is usually composed of a transistor structure referred as 2T1C (i.e., two transistors and one capacitor). A supply voltage and the threshold voltages of the transistors are parameters in the expression of the driving current generated by a 2T 1C driving circuit. Along with the increase in the size of display panel, the circuit for supplying power to the driving circuit is prolonged, and accordingly the equivalent impedance and voltage drop in the circuit are also increased. As a result, each pixel circuit receives a different supply voltage because of different distance of the pixel circuit to the power source, so that different driving currents are generated by the driving circuit. Accordingly, each pixel presents a different brightness so that an uneven brightness is produced on the display panel. Besides, because it is difficult to control each transistor in a large-sized display panel to have the same threshold voltage, the driving circuit having the 2T1C structure generates different driving currents along with different threshold voltages of the transistors. Thereby, how to resolve aforementioned problems has become one of major subjects in the development of large-sized liquid crystal display (LCD) panels.

SUMMARY OF THE INVENTION

Accordingly, the present invention is directed to a driving device of a light emitting unit, wherein the current generated by the driving device of the light emitting unit is not affected by the threshold voltage of any transistor or a supply voltage so that the light emitting unit can achieve a uniform brightness on each pixel of a display panel under the same data voltage.

The present invention provides a driving device of a light emitting unit. The driving device includes a driving circuit, a switch, a capacitor, and a compensation circuit. The driving circuit has a control terminal and a driving terminal, wherein the driving terminal is connected to the light emitting unit. The driving circuit determines the current on the driving terminal thereof according to the voltage on the control terminal thereof. A first end of the switch receives a data voltage, a second end of the switch is connected to the light emitting unit, and a control end of the switch receives a scan voltage. A first end of the capacitor is connected to the control terminal of the driving circuit, and a second end of the capacitor is connected to the second end of the switch. An output terminal of the compensation circuit is connected to the first end of the capacitor, and the compensation circuit supplies a reset voltage to the first end of the capacitor when the switch is turned on.

According to an embodiment of the present invention, the compensation circuit does not supply the reset voltage when the switch is turned off. The driving circuit includes a first transistor, wherein a first terminal of the first transistor receives a supply voltage, a second terminal of the first transistor is served as the driving terminal of the driving circuit, and a control terminal of the first transistor is served as the control terminal of the driving circuit.

According to an embodiment of the present invention, the compensation circuit includes a second transistor, wherein a first terminal of the second transistor receives an inverse voltage of the scan voltage, a second terminal of the second transistor is served as the output terminal of the compensation circuit, and a control terminal of the second transistor is connected to the second terminal of the second transistor.

According to an embodiment of the present invention, the compensation circuit includes a second transistor, wherein a first terminal of the second transistor receives a control voltage, a second terminal of the second transistor is served as the output terminal of the compensation circuit, and a control terminal of the second transistor is connected to the second terminal of the second transistor. The control voltage is the supply voltage when the switch is turned off, and the control voltage is pulled down to a reference voltage when the switch is turned on. The reset voltage contains a threshold voltage and the reference voltage.

According to an embodiment of the present invention, the compensation circuit includes a diode, wherein the cathode of the diode receives the inverse voltage of the scan voltage, and the anode of the diode is served as the output terminal of the compensation circuit.

According to an embodiment of the present invention, the compensation circuit includes a diode, wherein the cathode of the diode receives a control voltage, and the anode of the diode is served as the output terminal of the compensation circuit. The control voltage is a supply voltage when the switch is turned off, and the control voltage is pulled down to a reference voltage when the switch is turned on. The reset voltage contains a threshold voltage and the reference voltage.

According to an embodiment of the present invention, the switch includes a third transistor, wherein a first terminal of the third transistor receives the data voltage, a second terminal of the third transistor is connected to the light emitting unit, and a control terminal of the third transistor receives the scan voltage.

According to an embodiment of the present invention, the light emitting unit is a light emitting diode (LED) or an organic LED (OLED), and the light emitting unit and the driving device thereof are pixels of a display panel.

As described above, in embodiments of the present invention, the voltage between the control terminal and the driving terminal of a driving circuit is stabilized by using a compensation circuit and a capacitor, so that the current generated by the driving circuit is only related to a data voltage and a reference voltage but not to the threshold voltage of any transistor or a supply voltage. In addition, a light emitting unit achieves a uniform brightness on each pixel of a display panel under the same data voltage.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
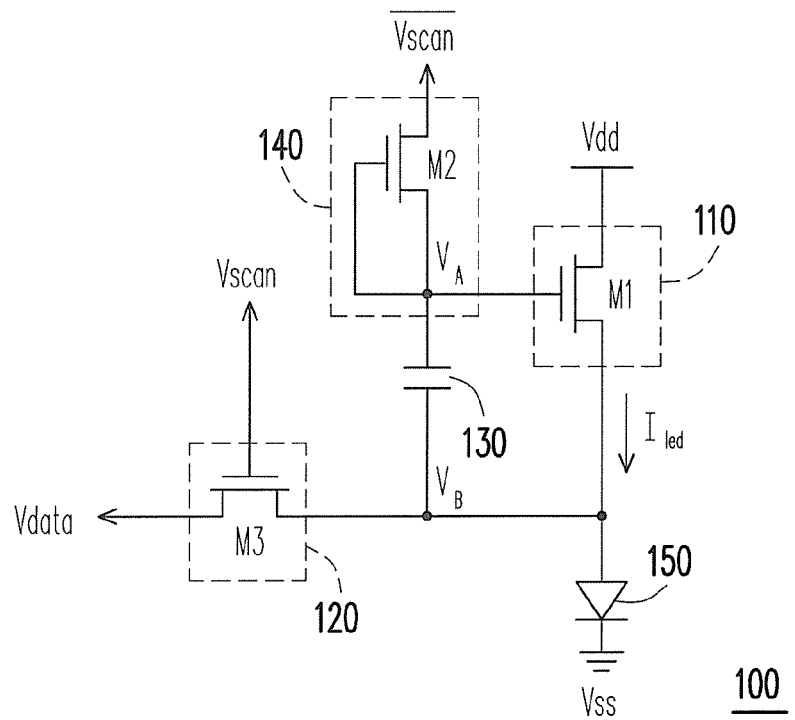
FIG. 1 is an equivalent circuit diagram of a driving device of a light emitting unit according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The present invention will be described below with reference to several embodiments, wherein a pixel driving circuit in a display panel will be taken as an example such that the spirit of the present invention can be well understood by those having ordinary knowledge in the art. FIG. 1 is an equivalent circuit diagram of a driving device 100 of a light emitting unit 150 according to a first embodiment of the present invention. In the present embodiment, the light emitting unit 150 and the driving device 100 are pixel circuits in a display panel. Referring to FIG. 1, the driving device 100 includes a driving circuit 110, a switch 120, a capacitor 130, and a compensation circuit 140. The driving circuit 110 has a control terminal and a driving terminal, wherein the driving terminal is connected to one end of the light emitting unit 150, and another end of the light emitting unit 150 receives a ground voltage Vss. The driving circuit 110 determines a driving current Iled generated on the driving terminal thereof according to a voltage VA on the control terminal thereof. Thereinafter, the voltage on the driving terminal of the driving circuit 110 will be referred to as a voltage VB.

A first end of the switch 120 receives a data voltage Vdata, a second end of the switch 120 is connected to the light emitting unit 150, and a control end of the switch 120 receives a scan voltage Vscan. A first end of the capacitor 130 is connected to the control terminal of the driving circuit 110, and a second end of the capacitor 130 is connected to the second end of the switch 120. An output terminal of the compensation circuit 140 is connected to the first end of the capacitor 130. The compensation circuit 140 supplies a reset voltage to the first end of the capacitor 130 when the switch 120 is turned on and stops supplying the reset voltage when the switch 120 is turned off, wherein the reset voltage contains a threshold voltage.

According to the present embodiment, the driving circuit 110 includes a first transistor M1. In the present embodiment, the first transistor M1 is an N-channel metal oxide semiconductor (NMOS) transistor. A first terminal (for example, the drain) of the first transistor M1 receives a supply voltage Vdd, a second terminal (for example, the source) of the first transistor M1 is served as the driving terminal of the driving circuit 110, and a control terminal (for example, the gate) of the first transistor M1 is served as the control terminal of the driving circuit 110. In other embodiments, the driving circuit 110 may also be implemented by using a current mirror circuit, and corresponding changes may be made according to the actual design requirement.

The compensation circuit 140 includes a second transistor M2. In the present embodiment, the second transistor M2 is a NMOS transistor. A first terminal (for example, the drain) of the second transistor M2 receives a control voltage, a second terminal (for example, the source) of the second transistor M2 is served as the output terminal of the compensation circuit 140, and a control terminal (for example, the gate) of the second transistor M2 is connected to the second terminal of the second transistor M2. Thus, the second transistor M2 presents the functions of a diode, wherein the anode of the diode is served as the output terminal of the compensation circuit 140 and connected to the control terminal of the driving circuit 110, and the cathode of the diode receives the control voltage. The control voltage is pulled up when the switch 120 is turned off, and the control voltage is pulled down when the switch 120 is turned on. In the present embodiment, the control voltage is implemented as the inverse voltage $\overline{Vscan}$ of the scan voltage Vscan. However, in other embodiments, the high and low level of the control voltage may be different from the high and low level of the scan voltage Vscan. When the switch 120 is turned off, the control voltage is pulled up to about the supply voltage Vdd, and when the switch 120 is turned on, the control voltage is pulled down to a reference voltage Vref. The level of the reference voltage Vref can be determined according to the actual design requirement. For example, the reference voltage Vref may be 0V or any fixed voltage lower than the supply voltage Vdd.

The switch 120 includes a third transistor M3. In the present embodiment, the third transistor M3 is a NMOS transistor. A first terminal (for example, the source) of the third transistor M3 receives the data voltage Vdata, a second terminal (for example, the drain) of the third transistor M3 is connected to the light emitting unit 150, and a control terminal (for example, the gate) of the third transistor M3 receives the scan voltage Vscan so as to control the on and off of the first end and the second end of the switch 120. However, the present invention is not limited thereto, and in other embodiments, the third transistor M3 may also be replaced with a circuit having the function of a switch. The light emitting unit 150 may be a light emitting diode (LED) or an organic LED (OLED). The driving current Iled generated by the driving circuit 110 is transmitted to the light emitting unit 150 to emit light. One end of the light emitting unit 150 is connected to the driving terminal of the driving circuit 110, the second end of the capacitor 130, and the second end of the switch 120, and another end of the light emitting unit 150 receives the ground voltage Vss.

Figure 2:
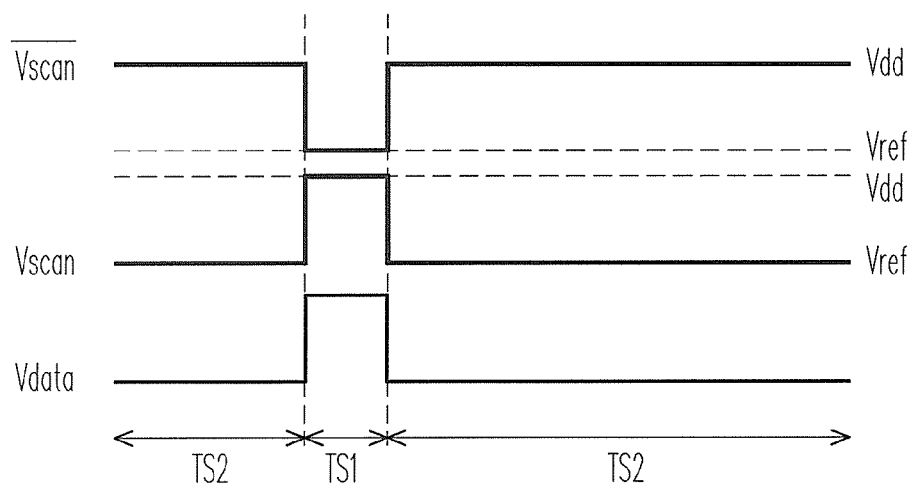
FIG. 2 is a driving timing diagram of the driving device in FIG. 1 according to the first embodiment of the present invention.

Below, the operation of the driving circuit 110 in the present embodiment will be described in detail with reference to both FIG. 1 and FIG. 2. FIG. 2 is a driving timing diagram of the driving device 100 of the light emitting unit 150 according to the first embodiment of the present invention. A driving time section is divided into a scan period TS1 and a latch period TS2. The scan voltage Vscan is at the high level (i.e., the switch 120 is turned on) during the scan period TS1. The display panel updates the data voltage Vdata of the pixel during the scan period TS1 and stores the data voltage Vdata into the capacitor 130. The scan voltage Vscan is at the low level (i.e., the switch 120 is turned off) during the latch period TS2. The driving device 100 of the pixel generates the driving current Iled for the light emitting unit 150 according to the data voltage Vdata stored in the capacitor 130 during the latch period TS2 so that the light emitting unit 150 can produce a brightness corresponding to the data voltage Vdata. Aforementioned high and low levels of the scan voltage Vscan are determined according to the actual design requirement. For example, the high level of the scan voltage Vscan may be about equal to the level of the supply voltage Vdd, and the low level of the scan voltage Vscan may be about equal to the predetermined reference voltage Vref.

Below, the operations during the scan period TS1 and the latch period TS2 will be described in detail. During the scan period TS1, the scan voltage Vscan is about equal to the supply voltage Vdd, and the control voltage $\overline{Vscan}$ is equal to the reference voltage Vref. Thus, the switch 120 is turned on, and accordingly the voltage VB on the driving terminal of the driving circuit 110 is data voltage Vdata. Meanwhile, because the control voltage $\overline{Vscan}$ is transformed into the reference voltage Vref, the charges at the first end of the capacitor 130 are discharged through the second transistor M2. Thus, the compensation circuit 140 supplies the reset voltage to the first end of the capacitor 130 when the switch 120 is turned on (i.e., during the scan period TS1), wherein the reset voltage contains the threshold voltage Vth_M2 of the second transistor M2 and the reference voltage Vref (i.e., Vref+Vth_M2). Below, the voltages VA and VB during scan period TS1 are respectively expressed with a expression (1) and a expression (2):

$$VA = Vref + Vth\_M2 \quad (1)$$

$$VB = Vdata \quad (2)$$

Herein, because the first transistor M1 of the driving circuit 110 works in a saturated region, a gate-source voltage Vgs on the first transistor M1 corresponding to the driving current Iled passing through the light emitting unit 150 and a threshold voltage Vth_M1 of the first transistor M1 are generated on the driving terminal of the driving circuit 110. The gate-source voltage Vgs represents the voltage difference between the gate and the source of the first transistor M1 (i.e., VA−VB). Below, the driving current Iled is expressed with an expression (3) so as to explain the relationship between the driving current Iled, the gate-source voltage Vgs, and the threshold voltage Vth_M1, wherein K is a constant. The expression (3) is expressed as following after the expression (1) and the expression (2) are brought in:

$$Iled = K(Vgs - Vth\_M1)^2 \quad (3)$$
$$= K(VA - VB - Vth\_M1)^2$$
$$= K(Vref + Vth\_M2 - Vdata - Vth\_M1)^2$$

Because the transistors M1, M2, and M3 in the driving device 100 are very close to each other and the transistors M1, M2, and M3 have the same size, the threshold voltages Vth_M1, Vth_M2, and Vth_M3 thereof have almost the same value, and accordingly the parameters Vth_M2 and Vth_M1 in foregoing expression (3) can offset each other. Thus, the driving current Iled can be further expressed with following simplified expression (4):

$$Iled = K(Vref - Vdata)^2 \quad (4)$$

As shown in expression (4), the driving current Iled in FIG. 1 is only related to the reference voltage Vref and the data voltage Vdata. The supply voltage Vdd, the threshold voltage Vth_M1 of the first transistor M1, and the threshold voltage Vth_M2 of the second transistor M2 are not parameters of the expression (4) anymore. Thus, the driving current Iled is not restricted by the supply voltage Vdd and the threshold voltage Vth_M1 of the first transistor M1.

During the latch period TS2, the scan voltage Vscan is at the low level (i.e., the reference voltage Vref), and the control voltage (i.e., the inverse voltage $\overline{Vscan}$ in the present embodiment) is at the high level (i.e., the supply voltage Vdd). The switch 120 is turned off due to the low level of the scan voltage Vscan. Thus, the voltage VB on the driving terminal of the driving circuit 110 is pulled down due to the forward biased state of the light emitting unit 150. The voltage level of the voltage VB is pulled down to Vx during the latch period TS2. Because of the capacitor's coupling effect, the voltage VA is also pulled down when the voltage VB is pulled down. Meanwhile, the control voltage $\overline{Vscan}$ is pulled up to a high level. Thus, the second transistor M2 is turned off during the latch period TS2. Namely, the compensation circuit 140 does not supply the reset voltage when the switch 120 is turned off.

Due to the coupling effect of the capacitor 130, the voltage difference between the voltage VA on the control terminal of the capacitor 130 and the voltage VB on the driving terminal thereof is stored in the capacitor 130, and accordingly the voltage VA on the control terminal and the voltage VB on the driving terminal are increased/decreased for the same amount. Thus, during the latch period TS2, the voltage VA on the control terminal is the reference voltage Vref plus the threshold voltage Vth_M2 of the second transistor M2 minus the consumed voltage of the voltage VB (the data voltage Vdata minus the current voltage Vx on the driving terminal of the driving circuit 110). Below, the voltages VA and VB during the latch period TS2 are respectively expressed with a expression (5) and a expression (6):

$$VA = Vref + Vth\_M2 - (Vdata - Vx) \quad (5)$$

$$VB = Vx \quad (6)$$

Herein the first transistor M1 of the driving circuit 110 is in a saturated region, and the driving current Iled generated on the driving terminal of the first transistor M1 for the light emitting unit 150 is expressed with following expression (7). Foregoing expression (5) and expression (6) are also brought into the expression (7), wherein the gate-source voltage Vgs of the first transistor M1 satisfies Vgs=VA−VB:

$$\begin{aligned}
Iled &= K(Vgs - \text{Vth\_M1})^2 \qquad (7)\\
&= K(VA - VB - \text{Vth\_M1})^2\\
&= K[Vref + \text{Vth\_M2} - (Vdata - Vx) - Vx - \text{Vth\_M1}]^2\\
&= K(Vref + \text{Vth\_M2} - Vdata + Vx - Vx - \text{Vth\_M1})^2\\
&= K(Vref + \text{Vth\_M2} - Vdata - \text{Vth\_M1})^2
\end{aligned}$$

As described above, because the threshold voltages Vth_M1, Vth_M2, and Vth_M3 of the transistors M1, M2, and M3 in the driving device 100 are almost the same, the parameters Vth_M2 and Vth_M1 in foregoing expression (7) can offset each other, and accordingly the driving current Iled can be expressed with following simplified expression (8):

$$Iled = K(Vref - Vdata)^2 \qquad (8)$$

It can be understood based on foregoing analysis that the expression (4) and the expression (8) are the same. Namely, the driving current Iled during the scan period TS1 is the same as the driving current Iled during the latch period TS2. Accordingly, the driving current Iled remains unchanged during every period. The brightness of the light emitting unit 150 remains unchanged before the next scan period TS1 and is not affected by the supply voltage Vdd or the threshold voltage Vth_M1 of the first transistor M1. Thus, the driving current Iled passing through the light emitting unit 150 does not produce different brightness along with different supply voltage Vdd and threshold voltage of the first transistor M1 obtained by each pixel.

Figure 3:
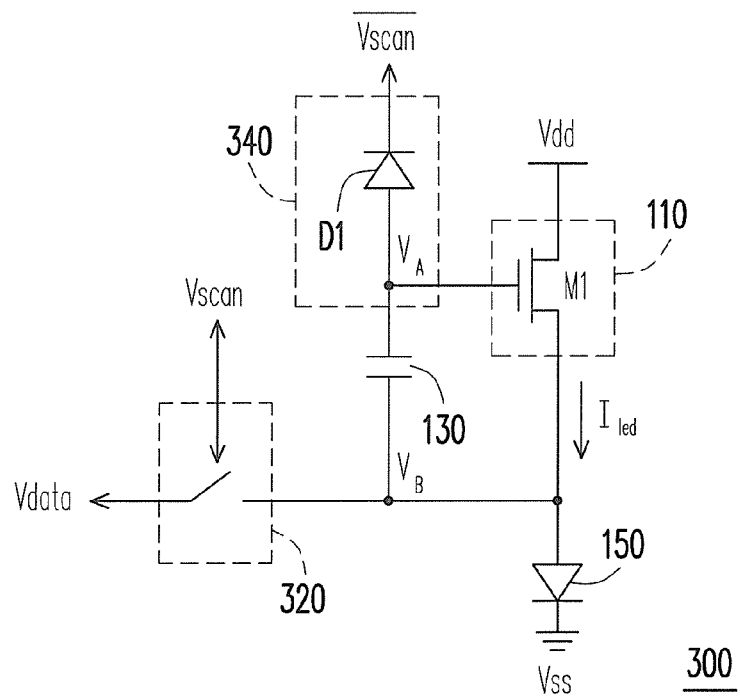
FIG. 3 is a circuit diagram of a driving device of a light emitting unit according to a second embodiment of the present invention.

The switch 120 and the compensation circuit 140 adopted by the driving device 100 of the light emitting unit 150 are respectively composed of the transistor M2 and the transistor M3. In other embodiments, the driving device 100 may also be composed of circuits having the same function so as to achieve the same operation. FIG. 3 is a circuit diagram of a driving device 300 of the light emitting unit 150 according to a second embodiment of the present invention. Referring to FIG. 3, the compensation circuit 340 includes a diode D1. The cathode of the diode D1 receives a control voltage, and the anode of the diode D1 is served as the output terminal of the compensation circuit 340. The control voltage is at a high level (for example, about equal to the supply voltage Vdd) when the switch 320 is turned off, and the control voltage is pulled down to foregoing predetermined reference voltage Vref when the switch 320 is turned on. In the present embodiment, the control voltage may be the inverse voltage $\overline{Vscan}$ of the scan voltage Vscan. Besides being implemented by using a single transistor, the switch 320 may be implemented by using a circuit having the same function. Other aspects of the present embodiment can be referred to the first embodiment described above therefore will not be described herein.

Figure 4:
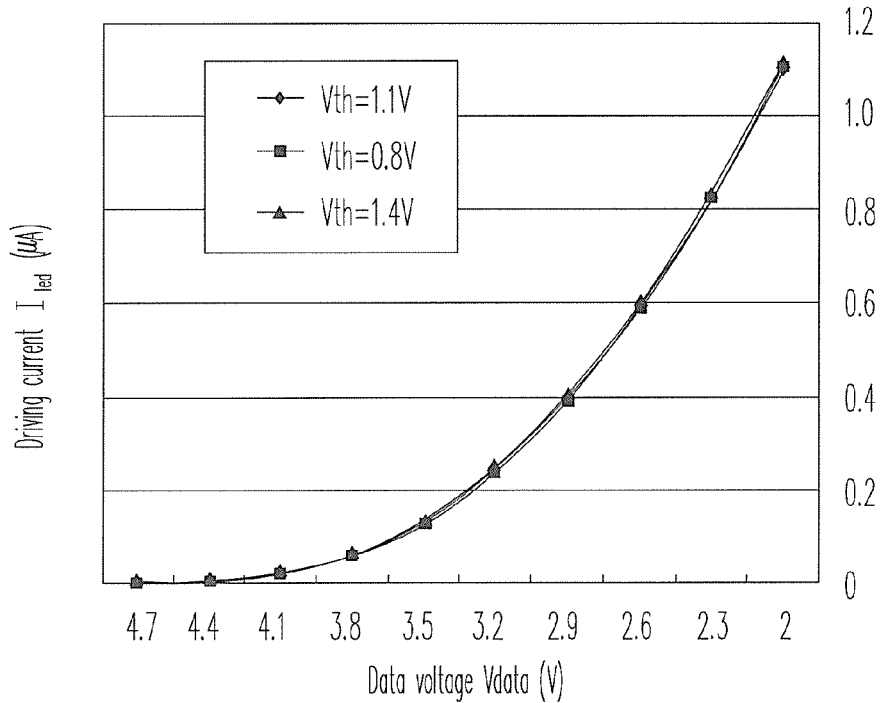
FIG. 4 illustrates the characteristic curves of a driving current and a data voltage of a light emitting unit according to the first embodiment of the present invention.

In order to clearly explain the affection of different transistor threshold voltage to the driving current Iled, the relationship between the threshold voltage Vth_M1 of the transistor M1 and the driving current Iled in the driving device 100 will be described with reference to FIGS. 1, 2, and 4. FIG. 4 illustrates the characteristic curves of the driving current Iled and the data voltage Vdata of the light emitting unit 150 according to the first embodiment of the present invention. Herein it is assumed that the supply voltage Vdd is 10V and the reference voltage Vref is 0V. In the present embodiment, the scan voltage Vscan is about equal to the supply voltage Vdd (10V) at its high level, and the scan voltage Vscan is equal to the reference voltage Vref (0V) at its low level. In the present embodiment, the control voltage is the inverse voltage $\overline{Vscan}$ of the scan voltage, and according to the design requirement of the present embodiment, the high level of the data voltage Vdata is 8 V and the low level thereof is 5V.

Herein the threshold voltage Vth_M1 of the transistor M1 in the driving device 100 is respectively set to 0.8V, 1.1V, and 1.4V, and the relationship between the data voltage Vdata and the driving current Iled in the driving device 100 is respectively verified based on these three conditions and illustrated in FIG. 4. As shown in FIG. 4, the variations of the driving current Iled with respect to different threshold voltage Vth_M1 are illustrated by using three curves with respectively the threshold voltage Vth_M1 of the transistor M1 as 0.8V (the curve connecting the square marks), 1.1V (the curve connecting the diamond-shaped marks), and 1.4V (the curve connecting the triangular marks). It can be understood based on the simulation results illustrated in FIG. 4, when the data voltage Vdata is 8V, the driving current Iled is 0 A, and accordingly the light emitting unit 150 does not emit light. On the other hand, when the data voltage gradually decreases from 8V to 5V, the driving current Iled gradually increases according to foregoing expression (4) and expression (8). Accordingly, the brightness of the light emitting unit 150 gradually increases, and the brightness of the light emitting unit 150 is in direct ratio to the driving current Iled. Namely, the greater the driving current Iled is, the brighter the light emitting unit 150 is. As shown in FIG. 4, the driving current Iled is almost unaffected by the variation of the threshold voltage Vth. The driving current Iled output by the driving device 100 changes along with the data voltage Vdata.

Figure 5:
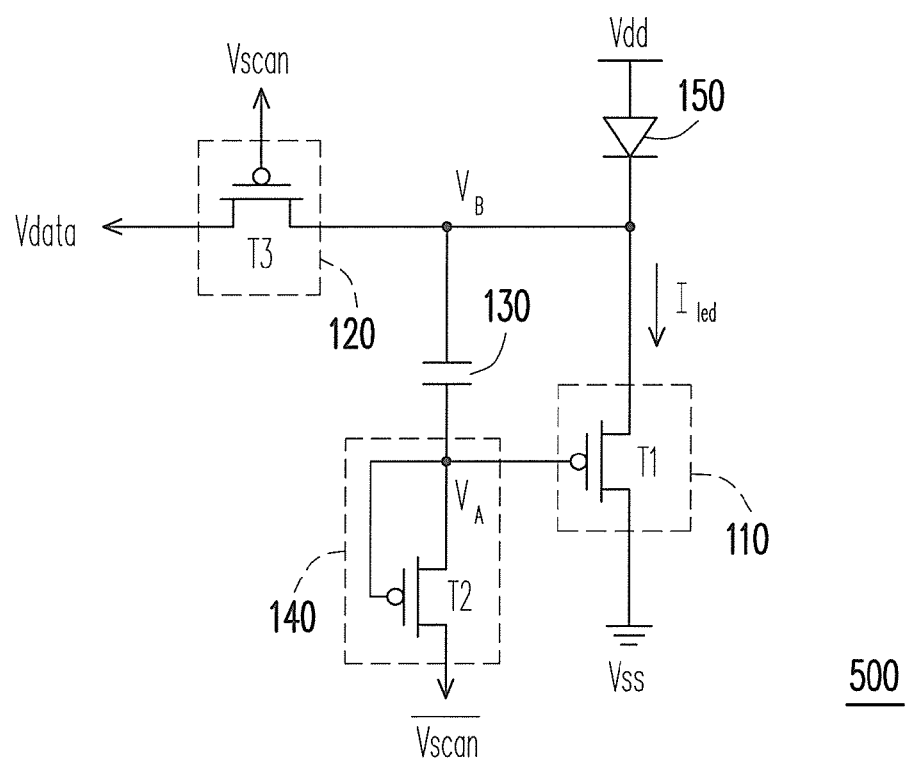
FIG. 5 is an equivalent circuit diagram of a driving device of a light emitting unit according to a third embodiment of the present invention.
Figure 6:
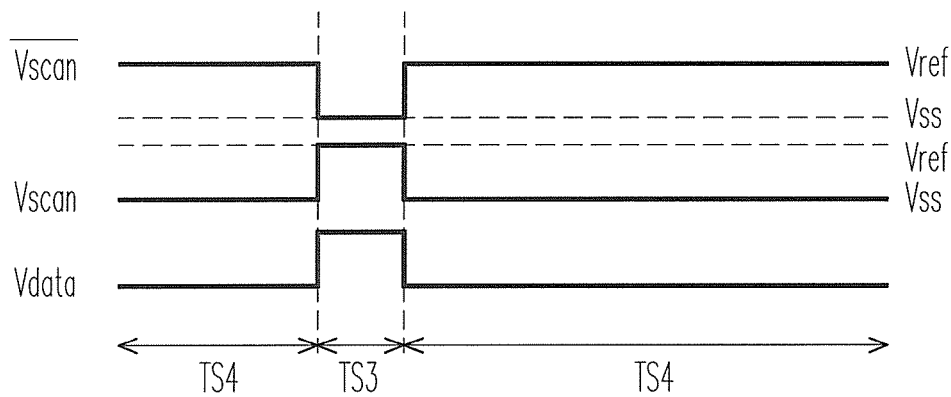
FIG. 6 is a driving timing diagram of the driving device in FIG. 5 according to the third embodiment of the present invention.

In each embodiment described above, the driving circuit 110, the switch 120, and the compensation circuit 140 adopted by the driving device 100 are all NMOS transistors. However, the present invention is not limited thereto, and in other embodiments, the driving device 100 may also be composed of P-channel metal oxide semiconductor (PMOS) transistors. FIG. 5 is an equivalent circuit diagram of a driving device 500 of the light emitting unit 150 according to a third embodiment of the present invention, and FIG. 6 is a driving timing diagram of the driving device 500 of the light emitting unit 150 according to the third embodiment of the present invention. Referring to FIG. 5 and FIG. 6, the present embodiment is different from the first embodiment in that the driving circuit 110, the compensation circuit 140, and the switch 120 are respectively composed of a first transistor T1, a second transistor T2, and a third transistor T3, and these transistors are all PMOS transistors.

In the present embodiment, the driving circuit 110 includes the first transistor T1. A first terminal (for example, the drain) of the first transistor T1 receives the ground voltage Vss, a second terminal (for example, the source) of the first transistor T1 is served as the driving terminal of the driving circuit 110 for connecting to the light emitting unit 150, and a control terminal (for example, the gate) of the first transistor T1 is served as the control terminal of the driving circuit 110. The switch 120 includes the third transistor T3. A first terminal (for example, the source) of the third transistor T3 receives the data voltage Vdata, a second terminal (for example, the drain) of the third transistor T3 is connected to the light emitting unit 150, and a control terminal (for example, the gate) of the third transistor T3 receives the scan voltage Vscan.

The compensation circuit 140 includes the second transistor T2. A first terminal (for example, the source) of the second transistor T2 is connected to the control terminal (for example, the gate) of the second transistor T2 so as to present the function of a diode, wherein the cathode of the diode is served as the output terminal of the compensation circuit 140 and connected to the first end of the capacitor 130. A second terminal (for example, the drain) of the second transistor T2 is connected to a control voltage. In the present embodiment, the control voltage is the inverse voltage $\overline{Vscan}$ of the scan voltage Vscan.

During the scan period TS3 of the driving time section in FIG. 6, the scan voltage Vscan is pulled down to a low level (about equal to the ground voltage Vss) so that the switch 120 is turned on. Thus, the voltage VB on the driving terminal of the driving circuit 110 is the data voltage Vdata. Meanwhile, because the control voltage (i.e., the inverse voltage $\overline{Vscan}$ the scan voltage Vscan) is pulled up to a high level (i.e., the reference voltage Vref), the voltage on the first end of the capacitor 130 (i.e., the voltage VA on the control terminal of the driving circuit 110) is charged and pulled up to a reset voltage by the second transistor T2, wherein the reset voltage contains the threshold voltage Vth_T2 of the second transistor T2 and the reference voltage Vref (i.e., Vref−Vth_T2). The voltages VA and VB during the scan period TS1 are respectively expressed with following expression (9) and expression (10):

$$VA = V\text{ref} - V\text{th}\_T2 \tag{9}$$

$$VB = V\text{data} \tag{10}$$

Herein the driving current Iled generated on the driving terminal of the driving circuit 110 for the light emitting unit 150 is related to the source-gate voltage Vsg of the first transistor T1 and the threshold voltage Vth_T1 of the first transistor T1, wherein the source-gate voltage Vsg represents the voltage difference between the source and the gate of the first transistor T1 (i.e., VB−VA). The relationship between the driving current Iled, the source-gate voltage Vsg, and the threshold voltage Vth_T1 is reflected in following expression (11) of the driving current Iled, wherein K is a constant. The expression (11) is as following after the expression (9) and the expression (10) are brought in:

$$\begin{aligned} Iled &= K(Vsg - V\text{th}\_T1)^2 \\ &= K(VB - VA - V\text{th}\_T1)^2 \\ &= K(V\text{data} - V\text{ref} + V\text{th}\_T2 - V\text{th}\_T1)^2 \end{aligned} \tag{11}$$

Because the transistors T1, T2, and T3 are very close to each other and have the same size, the threshold voltages Vth_T1, Vth_T2, and Vth_T3 thereof have almost the same value, and accordingly the parameters Vth_T2 and Vth_T1 in foregoing expression (11) can offset each other. Thus, the driving current Iled can be further expressed with following simplified expression (12):

$$Iled = K(V\text{data} - V\text{ref})^2 \tag{12}$$

During the latch period TS4, the scan voltage Vscan is pulled up to a high level (i.e., the reference voltage Vref) while the control voltage is pulled down to a low level (about equal to the ground voltage Vss). The transistor T3 is turned off due to the high level of the scan voltage Vscan. Thus, the voltage VB on the driving terminal of the driving circuit 110 is pulled up close to the supply voltage Vdd due to the forward biased state of the light emitting unit 150. Herein the voltage VB during the latch period TS2 is pulled up to a voltage Vx. Due to the capacitor's coupling effect, the voltage VA is pulled up along with the voltage VB. Meanwhile, the control voltage $\overline{Vscan}$ is pulled down to a low level. Thus, the second transistor T2 is turned off during the latch period TS2. The voltages VA and VB during the latch period TS4 are respectively expressed with following expression (13) and expression (14):

$$VA = V\text{ref} - V\text{th}\_T2 + (Vx - V\text{data}) \tag{13}$$

$$VB = Vx \tag{14}$$

Herein the driving current Iled is expressed with following expression (15), and the expression (13) and the expression (14) are also brought in, wherein the source-gate voltage Vsg of the first transistor T1 satisfies Vsg=VB−VA.

$$\begin{aligned} Iled &= K(Vsg - V\text{th}\_T1)^2 \\ &= K(VB - VA - V\text{th}\_T1)^2 \\ &= K[Vx - (V\text{ref} - V\text{th}\_T2 + Vx - V\text{data}) - V\text{th}\_T1]^2 \\ &= K(Vx - V\text{ref} + V\text{th}\_T2 - Vx + V\text{data} - V\text{th}\_T1)^2 \\ &= K(-V\text{ref} + V\text{th}\_T2 + V\text{data} - V\text{th}\_T1)^2 \end{aligned} \tag{15}$$

Because the threshold voltages Vth_T1, Vth_T2, and Vth_T3 of the transistors T1, T2, and T3 in the driving device 100 are almost the same, the parameters Vth_T2 and Vth_T1 in foregoing expression (15) can offset each other. Thus, the driving current Iled can be further expressed in following simplified expression (16):

$$Iled = K(V\text{data} - V\text{ref})^2 \tag{16}$$

Accordingly, the driving device 500 of the pixel can generate the driving current Iled for the light emitting unit 150 according to the voltage stored in the capacitor 130, so as to allow the light emitting unit 150 to produce a brightness corresponding to the data voltage Vdata. Other aspects of the present embodiment can be referred to the embodiments described above therefore will not be described herein.

As described above, in embodiments of the present invention, the voltage on the control terminal of the driving circuit is stabilized by using a compensation circuit and a capacitor, so that the driving current generated by the driving circuit is only related to the data voltage and the reference voltage and the light emitting unit on the display panel achieves a uniform brightness based on the same data voltage. In addition, according to the present invention, the threshold voltage of any transistor or the supply voltage does not appear in the expression of the driving current. Thus, the driving current is not affected by the threshold voltage of a transistor or the supply voltage.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A driving device of a light emitting unit, comprising:
   a driving circuit, having a control terminal and a driving terminal, wherein the driving terminal is connected to the light emitting unit, and the driving circuit determines a current on the driving terminal according to a voltage on the control terminal;
   a switch, having a first end for receiving a data voltage, a second end connected to the light emitting unit, and a control end for receiving a scan voltage;

a capacitor, having a first end connected to the control terminal of the driving circuit and a second end connected to the second end of the switch; and a compensation circuit, having an output terminal connected to the first end of the capacitor, wherein the compensation circuit supplies a reset voltage to the first end of the capacitor when the switch is turned on.

2. The driving device according to claim 1, wherein the compensation circuit does not supply the reset voltage when the switch is turned off.

3. The driving device according to claim 1, wherein the driving circuit comprises a first transistor, a first terminal of the first transistor receives a supply voltage, a second terminal of the first transistor is served as the driving terminal of the driving circuit, and a control terminal of the first transistor is served as the control terminal of the driving circuit.

4. The driving device according to claim 3, wherein the first transistor is an N-channel metal oxide semiconductor (NMOS) transistor.

5. The driving device according to claim 1, wherein the compensation circuit comprises a second transistor, a first terminal of the second transistor receives a inverse voltage of the scan voltage, a second terminal of the second transistor is served as the output terminal of the compensation circuit, and a control terminal of the second transistor is connected to the second terminal of the second transistor.

6. The driving device according to claim 1, wherein the compensation circuit comprises a second transistor, a first terminal of the second transistor receives a control voltage, a second terminal of the second transistor is served as the output terminal of the compensation circuit, a control terminal of the second transistor is connected to the second terminal of the second transistor, the control voltage is a supply voltage when the switch is turned off, and the control voltage is pulled down to a reference voltage when the switch is turned on, wherein the reset voltage contains a threshold voltage and the reference voltage.

7. The driving device according to claim 6, wherein the second transistor is a NMOS transistor.

8. The driving device according to claim 6, wherein the second transistor is a P-channel metal oxide semiconductor (PMOS) transistor.

9. The driving device according to claim 1, wherein the compensation circuit comprises a diode, a cathode of the diode receives an inverse voltage of the scan voltage, and an anode of the diode is served as the output terminal of the compensation circuit.

10. The driving device according to claim 1, wherein the compensation circuit comprises a diode, a cathode of the diode receives a control voltage, an anode of the diode is served as the output terminal of the compensation circuit, the control voltage is a supply voltage when the switch is turned off, and the control voltage is pulled down to a reference voltage when the switch is turned on, wherein the reset voltage contains a threshold voltage and the reference voltage.

11. The driving device according to claim 1, wherein the switch comprises a third transistor, a first terminal of the third transistor receives the data voltage, a second terminal of the third transistor is connected to the light emitting unit, and a control terminal of the third transistor receives the scan voltage.

12. The driving device according to claim 11, wherein the third transistor is a NMOS transistor.

13. The driving device according to claim 12, wherein the third transistor is a PMOS transistor.

14. The driving device according to claim 1, wherein the light emitting unit is a light emitting diode (LED).

15. The driving device according to claim 1, wherein the light emitting unit is an organic LED (OLED).

16. The driving device according to claim 1, wherein the light emitting unit and the driving device are pixels of a display panel.

17. The driving device according to claim 1, wherein the driving circuit comprises a first transistor, a first terminal of the first transistor receives a ground voltage, a second terminal of the first transistor is served as the driving terminal of the driving circuit, and a control terminal of the first transistor is served as the control terminal of the driving circuit.

18. The driving device according to claim 17, wherein the first transistor is a PMOS transistor.

* * * * *